(12) United States Patent
Rudolf et al.

(10) Patent No.: US 7,274,866 B2
(45) Date of Patent: Sep. 25, 2007

(54) POWER TOOL AND METHOD FOR CONTROLLING A POWER TOOL

(75) Inventors: Boris Rudolf, Stuttgart (DE); Sigmund Braun, Kusterdingen (DE)

(73) Assignee: C. & E. Fein GmbH (DE)

( * ) Notice: Subject to any disclaimer, the term of this patent is extended or adjusted under 35 U.S.C. 154(b) by 0 days.

(21) Appl. No.: 11/432,779

(22) Filed: May 11, 2006

(65) Prior Publication Data

US 2006/0255754 A1    Nov. 16, 2006

Related U.S. Application Data

(63) Continuation of application No. PCT/EP2004/012545, filed on Nov. 5, 2004.

(30) Foreign Application Priority Data

Nov. 11, 2003  (DE) ................................. 103 53 302

(51) Int. Cl.
*H02P 7/288*    (2006.01)
(52) U.S. Cl. ...................... 388/824; 388/937; 388/809; 318/245; 173/217
(58) Field of Classification Search ................ 388/809, 388/824, 937; 318/254; 173/217
See application file for complete search history.

(56) References Cited

U.S. PATENT DOCUMENTS

| 4,410,846 | A | * | 10/1983 | Gerber et al. | 318/490 |
| 4,412,158 | A | * | 10/1983 | Jefferson et al. | 318/257 |
| 4,454,459 | A | * | 6/1984 | Huber | 388/811 |
| 4,543,723 | A | * | 10/1985 | Bortfeld et al. | 30/381 |
| 4,636,961 | A | | 1/1987 | Bauer | 364/474 |
| 4,689,534 | A | * | 8/1987 | Gerber et al. | 388/809 |
| 5,105,130 | A | | 4/1992 | Barker et al. | 318/268 |
| 5,747,953 | A | * | 5/1998 | Philipp | 318/139 |
| 6,107,762 | A | * | 8/2000 | Schauer | 318/245 |

(Continued)

FOREIGN PATENT DOCUMENTS

DE    33 17 398 A1    11/1984

(Continued)

OTHER PUBLICATIONS

International Preliminary Report; Aug. 22, 2006; 7 pages.

(Continued)

*Primary Examiner*—Paul Ip
(74) *Attorney, Agent, or Firm*—St. Onge Steward Johnston & Reens LLC

(57) ABSTRACT

A power tool is disclosed comprising a controller for controlling at least one operating parameter, a motor for driving a tool, at least three switching elements which are coupled to the controller, and a speed sensor for monitoring the speed of the motor to generate a speed signal, which is fed to the controller. The controller is configured so that, in dependence on the speed signal, with simultaneous activation of a first and at least one other of the switching elements, a control signal for changing the operating parameter is output, and that, in dependence on the speed signal, with activation of the first and at least one other switching element, a control signal for modified changing of the operating parameter is output (FIG. 2).

19 Claims, 2 Drawing Sheets

U.S. PATENT DOCUMENTS

| | | | |
|---|---|---|---|
| 6,424,112 B1 * | 7/2002 | Schauer | 318/599 |
| 6,741,051 B2 * | 5/2004 | Chu | 318/376 |
| 6,742,266 B2 * | 6/2004 | Splane, Jr. | 30/392 |
| 7,075,195 B2 * | 7/2006 | Feil | 307/142 |
| 2003/0034164 A1 | 2/2003 | Rudolf et al. | 173/2 |
| 2003/0089511 A1 * | 5/2003 | Tsuneda et al. | 173/217 |

FOREIGN PATENT DOCUMENTS

| | | |
|---|---|---|
| DE | 33 29 971 A1 | 3/1985 |
| DE | 38 12 771 A1 | 10/1989 |
| DE | 29 26 111 C2 | 11/1989 |
| DE | 39 16 355 A1 | 12/1989 |
| DE | 40 27 135 C2 | 9/1995 |
| EP | 0 808 018 A1 | 5/1996 |
| EP | 1 073 191 A2 | 6/2000 |
| EP | 1 284 427 A2 | 7/2002 |
| GB | 2 217 480 A | 10/1989 |

OTHER PUBLICATIONS

International Search Report, Feb. 25, 2005, 3 pages.

* cited by examiner

POWER TOOL AND METHOD FOR CONTROLLING A POWER TOOL

CROSS-REFERENCE TO RELATED APPLICATIONS

This application is a continuation application of co-pending International Patent Application PCT/EP2004/012545 filed on Nov. 5, 2004 which claims priority of German patent application 103 53 302.8 filed on the Nov. 11, 2003 the contents of which is fully incorporated by reference herewith.

BACKGROUND OF THE INVENTION

The invention relates to a power tool with a controller for controlling at least one operating parameter, with a motor for driving a tool, and also to a method for controlling a power tool.

Power tools are often equipped with electronic controls for controlling the rotational speed of the drive motor. Generally serving here for the setting is an adjusting wheel or the like, which can only be actuated poorly during the operation of the power tool.

In the case of some power tools, however, it would be advantageous if a speed adjustment could also take place during work, in particular even under load. In addition, it would be advantageous if, apart from the speed, other operating parameters could be controlled in a simple way.

SUMMARY OF THE INVENTION

It is a first object to disclose a power tool and a method of controlling a power tool whereby an operating parameter can be controlled in a simple way.

It is a second object of the invention to disclose a power tool and a method of controlling a power tool whereby an operating parameter can be adjusted even during operation.

It is a third object to disclose a power tool and a method of controlling a power tool that allow an easy handling and operation of the power tool.

These and other objects are achieved according to the invention by a power tool with a controller for controlling at least one operating parameter, with a motor for driving a tool, with at least three switching elements, which are coupled to the controller, and with a speed sensor for monitoring the speed of the motor to generate a speed signal, which is fed to the controller, the controller being formed in such a way that, in dependence on the speed signal, with simultaneous activation of a first and at least one other of the switching elements, a control signal for changing the operating parameter is output, and that, in dependence on the speed signal, with activation of the first and at least one other switching element, a control signal for modified changing of the operating parameter is output.

The object is achieved furthermore by a method for controlling at least one operating parameter of a power tool which has a motor for driving a tool and at least three switching elements which are coupled to a controller for controlling the operating parameter, with the following steps:
monitoring the speed of the motor;
monitoring the operating states of the switching elements;
controlling an operating parameter in dependence on the speed of the motor and the switching states of the switching elements.

The object of the invention is completely achieved in this way.

This is so because, according to the invention, by monitoring the speed of the motor on the one hand and the switching states of the switching elements on the other hand, in dependence on the speed and the sensed switching states of the switching elements, a control signal for changing the operating parameter is output only in the case of a specific combination, while a modified control signal for modified changing of the operating parameter is output in the case of a specific other combination.

In this way, at least two specific switching elements must be simultaneously actuated and the motor must have a specific speed, which may be equal to zero or greater than zero, in order that a specific control signal for changing an operating parameter is generated, while a modified control signal for other changing of the operating parameter is output in the case of actuation of at least one other switching element.

In this way there is great flexibility in the selection of the operating parameters to be controlled and in the selection of the switching combinations of different switching elements, in order to output a specific control signal in dependence on the sensed speed of the power tool. In particular if the controller comprises a microprocessor, different control strategies for controlling one or more operating parameters can be realized by software. The operating parameter to be controlled may be, for example, the speed of the motor. Furthermore, in the case of such power tools in which switching over between right-hand rotation and left-hand rotation is made possible, it is conceivable to control the right-hand/left-hand rotation setting in dependence on the switching states of specific switching elements. Apart from these two possible operating parameters which can be monitored or controlled according to the invention, the monitoring or setting of further operating parameters is conceivable, involving for example a switching-off torque of a screwdriver or a safety value at which the power supply to the motor is interrupted in order to avoid a state of overloading or possible risk.

According to a first refinement of the invention, the operating parameter to be controlled is the speed of the motor, the controller being formed in such a way that, with the motor running (speed n>0) and with simultaneous activation of the first switching element and a second switching element, a control signal for reducing the speed is output, and, with the motor running and with simultaneous activation of the first switching element and a third switching element, a control signal for increasing the speed is output.

Although it would not be ruled out in principle to allow a changed setting of the desired speed even when the motor is stationary, it is preferred for reasons of safety to allow such a setting only during operation. This is also advantageous for the user, since he can immediately perceive the changed setting of the speed directly. This is even possible when working under load.

It is therefore preferred according to a further embodiment of the invention that no control signal for changing the speed is output when the motor is stationary.

According to a further embodiment of the invention, the controller is formed in such a way that, with simultaneous activation of the first and second switching elements or the first and third switching elements, the desired value of the speed is continuously changed, until either a threshold value is reached or at least one of the switching elements is deactivated.

In this way, continuous changing of the desired speed value is made possible, in order in this way to allow infinitely variable setting of the desired speed value.

According to an alternative embodiment of the invention, the controller is formed in such a way that, with simultaneous activation of the first and second switching elements or the first and third switching elements, the desired value of the speed is changed by a predetermined speed increment, but at most until a threshold value is reached, and that, for further changing of the speed, the deactivation of at least one switching element and subsequent activation of the first and second switching elements or the first and third switching elements is required.

Even with such staged changing of the speed, or by secure holding of the first switching element and alternative actuation of a further switching element, a speed adjustment that is simple for the user can be realized, it also being possible for specific, predetermined speed stages to be set.

In an additional development of the invention, a memory means is provided for storing a last-set desired speed value, which is output by the controller at the time of the deactivation of at least one of the switching elements previously activated for speed setting.

The memory means may be formed here in such a way that a stored desired speed value is retained even after the motor is at a standstill or is switched off. In this way, a desired speed value that has once been set is maintained during work with the power tool, or, even after switching off and renewed switching on of the motor, the tool is set again to the desired speed value. Furthermore, after switching off, setting to a specific standard speed value, which may possibly be permanently programmed in, or may be stored by actuating a specific combination of switching elements, is conceivable.

According to a further embodiment of the invention, an operating parameter to be controlled is the setting of right-hand/left-hand rotation, a control signal for setting the motor to right-hand rotation being output with activation of a first and a further switching element, and a control signal for setting the motor to left-hand rotation being output with activation of the first and at least one other switching element.

In principle, it is possible when using a microprocessor-controlled controller for this switching over between right-hand and left-hand rotation to be performed while the motor is already running. In this case, the controller detects the switching-over signal, runs the motor down to a speed of 0 and then changes over the direction of rotation. Alternatively, the control may also be designed in such a way that a control command by means of actuating the switching elements is only accepted if the motor is stationary (n=0). In this way, an operating concept that is clearly evident to the user can be used.

According to a further embodiment of the invention, the power tool has a housing which has a left-hand gripping region and a right-hand gripping region, activating members for the second and third switching elements being provided in the left-hand and right-hand gripping regions.

In this way, the various switching elements can be mounted in the gripping region for holding the power tool, in order in this way to make particularly ergonomic operation possible.

According to a further refinement of the invention, the housing has a central region, at which an activating member for the first switching element is provided.

This allows the first switching element, which in the case of various variants of the invention definitely has to be actuated in order to initiate a changed setting of the operating parameter to be controlled, to be arranged centrally in such a way that it can be reached.

According to a further refinement of the invention, the activating members for actuating the switching elements are formed as flexible pushbuttons.

In this way, a particularly ergonomic design of the power tool can be achieved.

According to a further refinement of the invention, which is preferred in particular when the power tool is designed as an angle grinder, the housing is formed substantially in a bar-shaped manner and has at one end of the housing a gearhead, on which the first switching element is mounted, while the second and third switching elements are provided on the left-hand and right-hand sides of the housing.

The housing is preferably dimensioned here in such a way that grasping with one hand is made possible, the flexible pushbuttons for the second and third switching elements being arranged in the gripping region of the thumb on the one side and the index finger or middle finger on the other side.

In this way, particularly ergonomic design and handling is made possible, in particular for the case of an angle grinder.

According to an alternative embodiment of the invention, which is advantageous in particular when the power tool is designed as a screwdriver or drill, the housing is formed substantially in a pistol-shaped manner, the pushbutton for the first switching element being arranged in the center of a pistol grip in the gripping region of the index finger and the pushbuttons for the second and third switching elements being arranged on the right-hand and left-hand sides of the housing.

In this way, holding of the power tool at the pistol grip can be combined with deliberate actuation of the second and third switching elements for adjusting the operating parameter, which is made possible only with the other hand.

According to a further refinement of the invention, the power tool has a fourth and a fifth switching element, the controller being formed in such a way that the first switching element and optionally the second or fourth switching element have to be activated for increasing the speed and the first and optionally the third or fifth switching element have to be activated for reducing the speed.

The pushbuttons for activating the fourth and fifth switching elements are preferably located here on the left-hand and right-hand sides of the housing, at the end of the housing that is opposite from the gearhead.

In this way, an adjusting possibility for setting the operating parameter that can easily be remembered by a user can be predetermined, for instance in such a way that at least one of the two switching elements arranged on the left-hand side of the housing must be actuated in combination with the first switching element in order for instance to bring about a reduction of the speed. Conversely, the first switching element and one of the two switching elements arranged on the right-hand side of the housing must then be actuated to increase the speed.

According to a further refinement of the invention, the controller is formed in such a way that switching on of the motor is made possible only with simultaneous activation of at least two switching elements.

It is preferred here for the controller to be formed in such a way that switching on of the motor is made possible only with simultaneous activation of a switching element arranged in a front region of the housing and a switching element arranged in a rear region of the housing.

In this way it can be ensured that, when the power tool is seized in the region of flexible buttons by means of which the assigned switching elements can be activated, starting-up of the motor is only made possible if a further pushbutton is actuated with a second hand. In this way, increased safety is ensured, since two-handed actuation is therefore necessary in order to start the motor.

According to a further refinement of the invention, an optical indicator element to display a set operating parameter is provided.

This also has the effect of increasing safety and makes working easier for the user, since it is optically evident at any time which operating parameter has been set, that is to say for example which desired speed has been set or whether right-hand/left-hand rotation has been set.

According to a further refinement of the invention, at least one of the switching elements is formed as an optical switching element, by means of which a light beam which is emitted by a transmitting conductor and fed to a receiving conductor is influenced and the changing of the light signal coupled into the receiving conductor is evaluated to generate a switching signal.

According to this measure, which is known per se in principle from EP-A-1 284 427, a particularly ergonomic design of the power tool can be achieved, since in this way a whole series of optical switching elements can be arranged at different positions of the housing, since no regard to special insulation from the power voltage has to be paid here. Furthermore, the switching elements can be miniaturized and durable actuation during operation can be easily made possible by means of flexible pushbuttons.

Substantially similar results can be achieved if the switching elements are formed as micro-switches which respectively lie in a signal circuit.

A power element which, for controlling the motor, lies in a load circuit may preferably be galvanically isolated from the micro-switches here. This has the advantage that—as also in the refinement with optical switching elements—no regard has to be paid to regulations for protection with respect to galvanic isolation from the power voltage. Therefore, the micro-switches concerned, and also the optical switching elements, can be placed particularly favorably from an ergonomic viewpoint.

As already mentioned, in an advantageous development of the method according to the invention, the speed of the motor is controlled as the operating parameter and a control signal for reducing the speed is output with simultaneous activation of the first and a further switching element, while the control signal for increasing the speed is output with simultaneous activation of the first and another switching element.

As likewise already mentioned, in an advantageous development of the method according to the invention, the setting of right-hand/left-hand rotation is controlled as the operating parameter and a control signal for setting the motor to right-hand rotation is output with activation of the first and a further switching element, and a control signal for setting the motor to left-hand rotation is output with activation of the first and at least one other switching element.

If desired, starting-up of the motor can only be made possible if at least two of the switching elements are activated simultaneously.

According to a further refinement of the invention, a signal for stopping the motor is generated with the motor running when specific switching elements are deactivated, whereby braking of the motor can be simultaneously initiated.

This allows increased safety to be ensured, in particular in the case of those power tools which pose a relatively high potential risk, such as for instance angle grinders, circular saws or the like.

In conjunction with the necessary actuation of the first switching element for activating the setting operation for the speed adjustment and with the actuation of a switching element on the right-hand side of the housing for increasing the speed and on the left-hand side for reducing the speed, an operating concept that can be remembered by the user is therefore obtained: for starting the motor, two switching elements, in a front region and a rear region of the housing, must be activated simultaneously, so that deliberate switching on of the power tool is ensured, and running of the motor when the power tool is simply grasped with one hand is avoided. If the speed is then to be adjusted, the first switching element in the middle of the housing is actuated with the motor running and at the same time a switching element on the left-hand or right-hand side of the housing is actuated to reduce or increase the speed. The latter can be performed with the hand with which the power tool is also held.

It goes without saying that the features of the invention mentioned above and those still to be explained below can be used not only in the combination respectively given but also in other combinations or on their own without departing from the scope of the invention.

BRIEF DESCRIPTION OF THE DRAWINGS

Further features and advantages of the invention emerge from the description which follows of preferred exemplary embodiments and with reference to the drawing, in which.

DETAILED DESCRIPTION OF THE PREFERRED EMBODIMENTS

Figure 1:
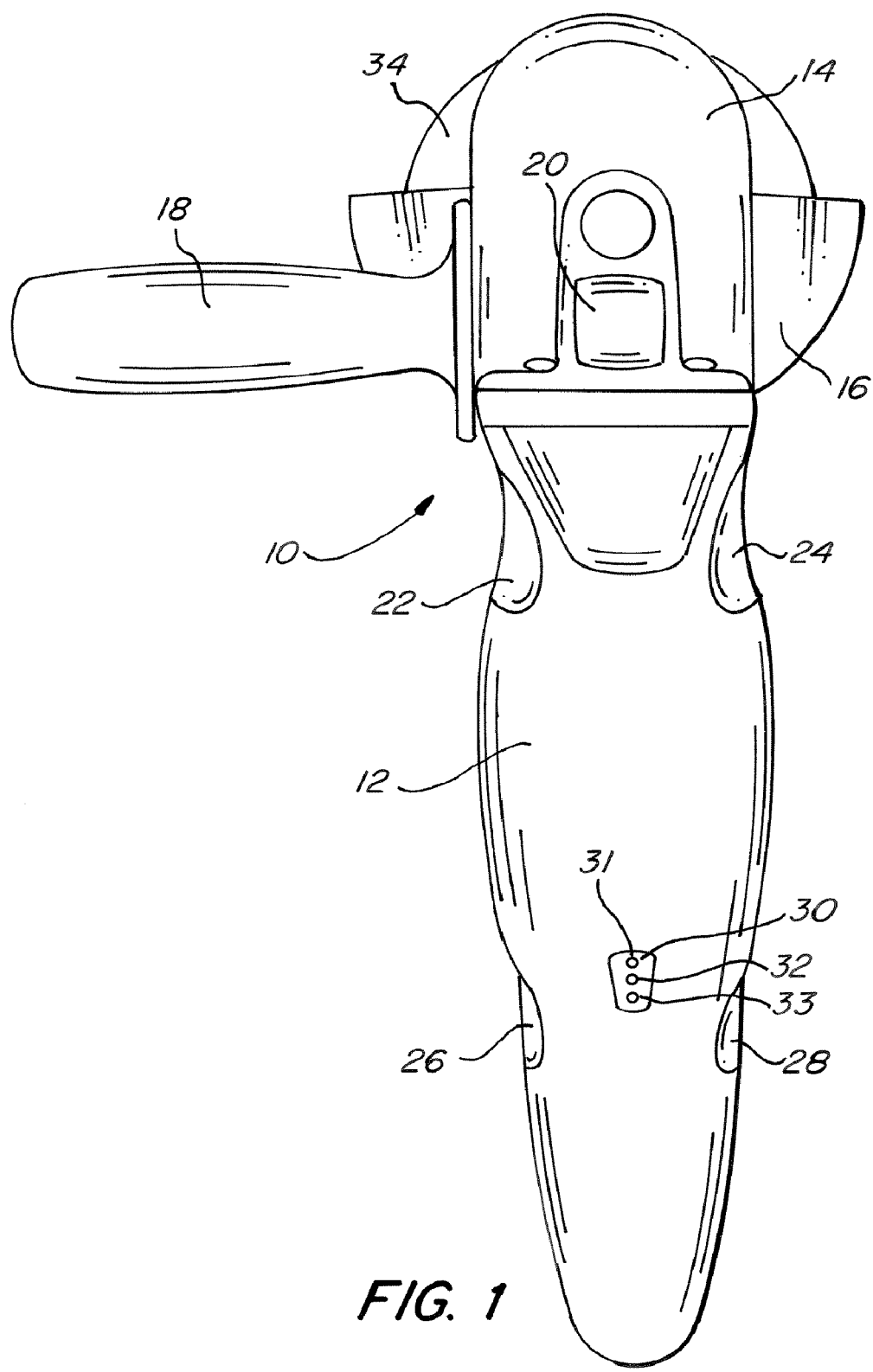
FIG. 1 shows a view from above of the first embodiment of a power tool according to the invention in the form of an angle grinder.

In FIG. 1, a power tool according to the invention, which is designed as an angle grinder, is designated overall by the number 10.

Figure 2:
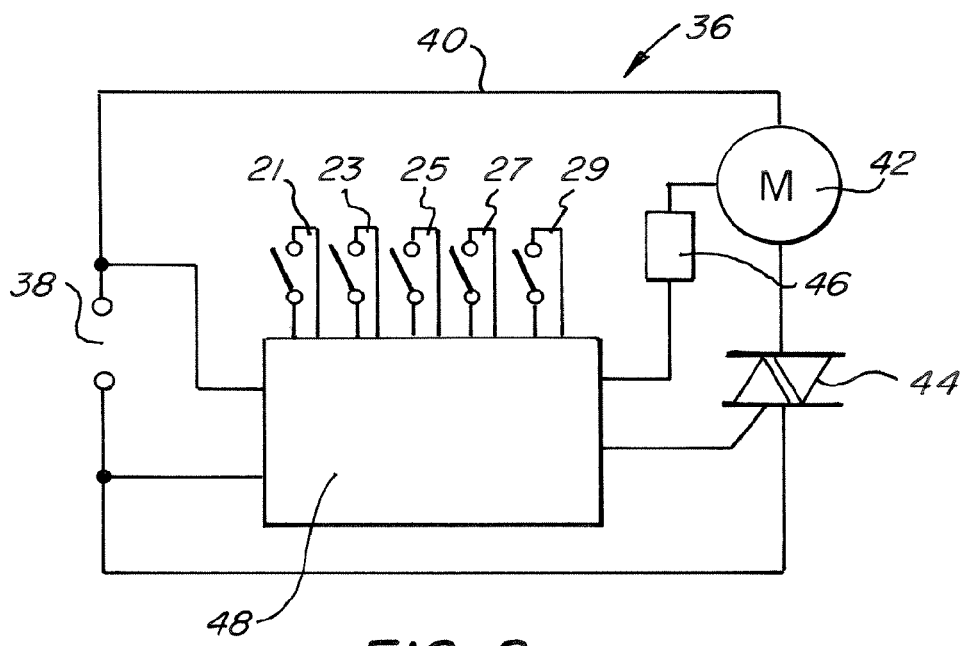
FIG. 2 shows a simplified basic circuit of the power tool according to FIG. 1.

A simplified basic circuit of the power tool 10 according to FIG. 1 is designated overall in FIG. 2 by the number 36.

The power tool 10 has an elongate, approximately bar-shaped housing 12, at one end of which a gearhead 14 is provided, on the underside of which a protective shroud 16 is mounted. Provided at the outer end of the drive shaft protruding out from the gearhead is a holder for receiving a tool 34 in the form of a grinding wheel or cutting wheel. To the left or right, a stem handle 18 can be screwed onto the gearhead 14, as can be seen from FIG. 1.

The region of the housing 12 that is formed symmetrically with respect to its longitudinal axis and directly adjoins the gearhead 14 is narrowed on both sides, in order to form a gripping region, on which the housing 12 can be easily gripped with one hand and can be easily held by the thumb on one side and by the other fingers on the other side. In the middle of the gearhead, approximately level with the stem handle 18, there is an upwardly protruding first pushbutton 20, by means of which a first switching element (cf. number 21 according to FIG. 2) can be actuated. In the narrowing region of the housing 12 which adjoins the gearhead 14 there are on the left-hand and right-hand sides of the housing two flexible pushbuttons, namely a second flexible pushbutton 22 and a third flexible pushbutton 24. These flexible pushbuttons 22, 24 are assigned switching elements 23, 25, which are activated by means of them (cf. FIG. 2).

At the end region opposite from the gearhead 14 (approximately in the outer third of the housing 12), a further narrowing of the housing is provided on both sides. In the narrowing region, further pushbuttons are provided on the left-hand side of the housing and the right-hand side of the housing, namely a fourth pushbutton 26 on the left-hand side and a fifth pushbutton 28 on the right-hand side. Further switching elements 27, 29 can be actuated by means of these pushbuttons 26, 28 (cf. FIG. 2).

According to the basic circuit 36 according to FIG. 2, the motor 42 lies in a power circuit 40. The motor 42 is supplied with voltage from a voltage source 38 (230 V AC voltage) via a power switching element 44, for example in the form of a triac. If appropriate, an on/off switch, by which the appliance is put into operation (not represented), may be additionally provided in the load circuit 40. The switching elements 21, 23, 25, 27, 29 take the form of micro-switches or optical switches and are respectively connected to a common control circuit 48. In the case of the embodiment represented as a micro-switch, each of the switching elements 21 to 29 lies in a signal circuit which can be closed by the switching element concerned.

As a preferred variant (not graphically represented), each of the switching elements 21, 23, 25, 27, 29 may also be formed as an optical switching element, which optically influences a light signal which is fed via a transmitting conductor and evaluated by means of a receiving conductor.

This allows simple spring-loaded sensing elements, by which the light beam can be interrupted, to be provided for instance at two ends lying opposite each other of the transmitting conductor and the receiving conductor. For details, reference is made in this regard to US patent application published as US 2003/0034164 A1, the content of which is fully incorporated by reference.

Since the switching elements 21 to 29 in the form of optical switching elements or micro-switches are preferably galvanically isolated from the load circuit 40, shock protection is obtained irrespective of where the switching elements concerned are integrated in the power tool. In this way it is made possible to arrange the switching elements concerned, with the assigned flexible pushbuttons, at the locations that are particularly favorable ergonomically, as explained above on the basis of FIG. 1.

Furthermore, the circuit 36 according to FIG. 2 has a speed sensor (tachogenerator) 46, by means of which the speed of the motor shaft or of an output shaft which is connected to it by means of a gear mechanism and on which the tool holder is provided is monitored. The output signal of the speed sensor 46 is digitized and fed to the controller 48. The preferably microprocessor-controlled control unit 48 monitors all the safety functions of the power tool 10, controls the power output or speed of the motor 42 by means of the power switching element 44 and makes possible the setting of specific operating parameters in dependence on the switching state of the switching elements 21, 23, 25, 27 and 29 and in dependence on the speed signal obtained.

The microprocessor of the controller 48 is then programmed in such a way that an adjustment of the desired speed can only be performed with the motor running, to be precise by the first pushbutton 20 and one of the pushbuttons 22, 24, 26, 28 being pressed simultaneously, in order to actuate the assigned switching element 21, 23, 25, 27, 29. Here, the switching elements 23, 27, which are assigned to the pushbuttons on the left-hand side of the housing, are provided in connection with the switching element 21 for lowering the desired speed, while the switching elements 25, 29, which are assigned to the pushbuttons 24, 28 on the right-hand side of the housing, serve in connection with the switching element 21 for increasing the desired speed. If, therefore, the speed sensor signals a running motor (n>0), actuation of the first pushbutton 20 in combination with the second pushbutton 22 and/or the fourth pushbutton 26 leads to a reduction of the desired speed, until a lower threshold value is reached. If, on the other hand, the first pushbutton 20 is actuated in connection with the third pushbutton 24 and/or the first pushbutton 28, an increase of the desired speed is obtained, until an upper threshold value is reached. If the pushbutton 20 or one of the other pushbuttons is released and only a single pushbutton 22, 24, 26 or 28 is then activated, the last-set desired speed value is stored. This desired speed value is also set after the tool is switched off and started up again later.

It goes without saying that, whenever reference is made here to a desired speed value, this can only be achieved during idling and that other speeds are of course obtained under loading.

According to FIG. 1, serving for displaying the desired speed is an indicator element 30, which is located on the upper side of the housing 12, approximately midway between the two pushbuttons 26 and 28. The indicator element contains three LEDs 31, 32, 33, which are arranged one behind the other. The indicator element 30 has a viewing area, which tapers such that it is more slender toward the end opposite from the gearhead 14 and widens toward the other side. This allows a total of five speed settings to be optically displayed. If only the LED 33 lights up, this indicates the lowest speed. If the middle LED 32 lights up, this indicates a moderate speed, if only the LED 31 toward the gearhead 14 lights up, this indicates the maximum speed. If both the LED 31 and the LED 32 light up, this shows an intermediate value between a moderate speed and the highest speed. If the LED 32 and the LED 33 light up, this indicates an intermediate value between the moderate speed and the lowest speed.

As a consequence of the optical switches or micro-switches that are used, the switching elements 21, 23, 25, 27, 29 can be operated with extremely little expenditure of force via the assigned flexible pushbuttons 20, 22, 24, 26, 28, which may consist for instance of a yielding plastic. The power tool 10 can therefore be held with one hand by grasping the housing 12 at the narrowing before the transition to the gear head 14, the thumb resting on the pushbutton 22 on the left-hand side of the housing and the fingers lying on the pushbutton 24 on the right-hand side of the housing when it is grasped with the right-hand.

The switching logic which the control unit 48 has is then programmed in such a way that starting-up of the tool is only made possible when, in addition to one of the two switching elements 23, 25, which are actuated by means of the front pushbuttons 22, 24, a switching element 27 or 29 is also actuated by means of a pushbutton 26, 28 in the rear region of the housing 12. This is conceived as a safeguard against starting-up of the power tool 10 when it is simply grasped with one hand, since a second hand is necessary for the actuation of the rear switching element, and consequently two-handed actuation is required for starting-up the power tool 10. After starting-up of the motor 42, the activation of any switching element 23, 25, 27, 29 is sufficient to keep the motor in operation. If, however, all the pushbuttons 22, 24, 26, 28 are released, the power switching element 44 blocks completely, so that the tool runs down. If appropriate, braking may be additionally realized in an electronic way. On the other hand, the switching element 21, which can be activated by means of the pushbutton 20, is provided only for the activation of the speed adjustment. If the switching element 21 is activated by pressing the pushbutton 20 and at the same time a switching element 23 or 27 on the left-hand side of the housing or a switching element 25 or 29 on the right-hand side of the housing, either a speed reduction or speed increase is initiated, which takes place continuously until the switching element 21 is released again or else a lower or upper threshold value is reached.

If, on the other hand, the switching element 21 and at the same time a switching element 23 or 27 on the left-hand side of the housing and a switching element 25 or 29 on the right-hand side of the housing are activated, no change of speed takes place.

Figure 3:
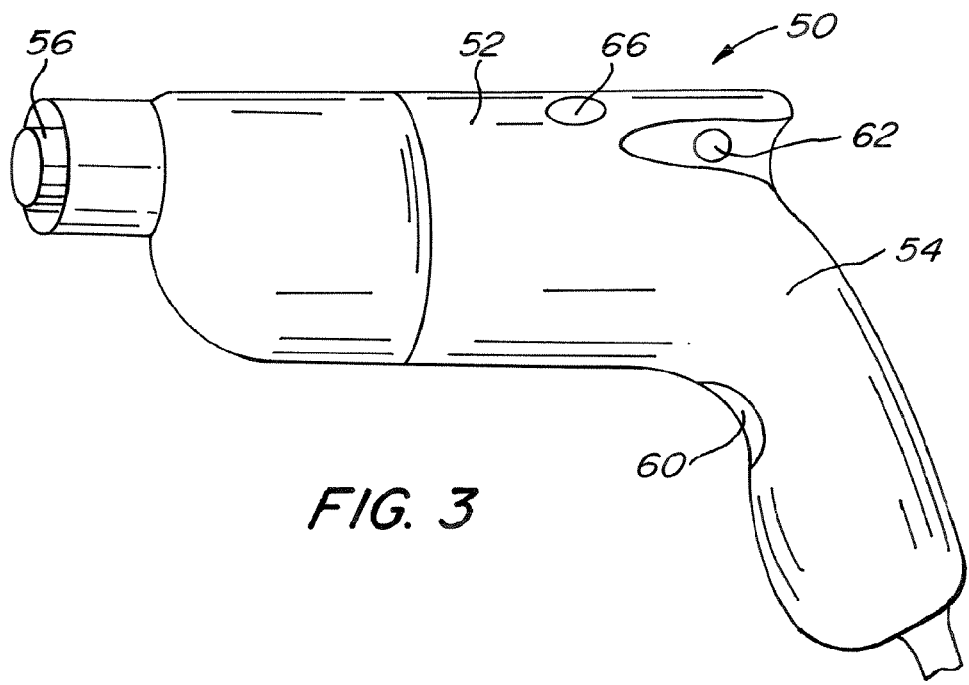
FIG. 3 shows a side view of a further power tool according to the invention in the form of a screwdriver or drill.

In FIG. 3, a further exemplary embodiment of a power tool according to the invention is represented and designated overall by the number 50. This power tool 50 is designed as a screwdriver or drill with a pistol-shaped housing 52 and has a pistol grip 54. Provided in the middle of the pistol grip 54, level with the region which can be enclosed by the index finger, is a pushbutton 60, by means of which an assigned switching element can be actuated. At the upper end, opposite from the tool holder 56 of the drive shaft, a flexible pushbutton is respectively provided on the right-hand and left-hand sides of the housing. In this respect, only the pushbutton 62 on the left-hand side of the housing can be seen in FIG. 3, while the corresponding pushbutton on the right-hand side of the housing cannot be seen of course. Since a screwdriver or drill does not present any particular potential risk, as for instance in the case of an angle grinder, the controller may then be designed here in such a way that, when there is actuation of the switching elements assigned to the pushbutton 60, starting-up of the motor immediately takes place. The pushbutton 62 on the left-hand side of the housing or the assigned pushbutton on the right-hand side of the housing can then be used for speed adjustment, with simultaneous actuation of the pushbutton 60. As also in the case of the embodiment of the power tool 10 according to FIG. 1, in this case once again a speed reduction preferably takes place with actuation of the pushbutton 62 on the left-hand side of the housing and, conversely, a speed increase takes place with actuation of the pushbutton on the right-hand side of the housing, with simultaneous actuation of the pushbutton 60. Since in the case of a screwdriver or drill, two-handed actuation is not required for safety reasons, three pushbuttons or assigned switching elements are therefore sufficient for this, in order to make starting-up of the tool and speed adjustment possible. Here, too, the controller 48 is preferably designed in such a way that a speed adjustment only takes place if the speed sensor receives a speed signal, and consequently the motor or the drive shaft is rotating.

In addition or as an alternative to the speed adjusting possibility, this power tool 50 may then have an electronic change-over possibility for right-hand/left-hand rotation. For this purpose, once again two pushbuttons by means of which the assigned switching elements can be actuated are provided on the left-hand and right-hand sides of the housing. Of course, in FIG. 3 only the pushbutton 66 on the left-hand side of the housing can be seen, while the opposite pushbutton on the right-hand side of the housing is hidden. These pushbuttons are significantly offset forward from the other pushbuttons 62, in order to avoid inadvertent actuation and to provide logical separation between the pushbuttons 62 for speed adjustment and 66 for setting right-hand/left-hand rotation.

The arrangement can then be set up in such a way that, with simultaneous actuation of the pushbutton 60 and the pushbutton 66 on the left-hand side of the housing and with the motor stationary, switching over to left-hand rotation takes place if left-hand rotation is not already set. If, on the other hand, the pushbutton 60 and the pushbutton opposite from the pushbutton 66 on the right-hand side of the housing are actuated simultaneously, the changeover to right-hand rotation takes place if right-hand rotation is not already set.

If, with the motor running, one of the pushbuttons 66 on the left-hand side of the housing or on the opposite side of the housing is actuated, the motor is firstly run down by the controller and then the switching-over to the other direction of rotation is performed. Alternatively, the arrangement could also be set up in such a way that switching-over between right-hand and left-hand rotation is only made possible when the motor is stationary, i.e. the speed sensor does not receive a signal (n=0).

What is claimed is:

1. A power tool comprising:
   a motor for driving a tool;
   a controller for controlling the power tool;
   a first, a second and at least a third switching element, said switching elements being coupled to said controller; and
   a speed sensor for monitoring a speed of the motor to generate a speed signal which is input to said controller;
   wherein said controller is configured for increasing said speed, if said speed signal indicates a speed greater than zero, and if said first switching element and said second switching element are activated simultaneously; and
   decreasing said speed, if said speed signal indicates a speed greater than zero, and if at least two switching elements are activated simultaneously, at least one of which being different from said first and second switching elements.

2. The power tool of claim 1, wherein said controller is configured to keep said motor idle, if said speed signal indicates a speed equal to zero.

3. The power tool of claim 1, wherein said controller is configured in such a way that, with simultaneous activation of said switching elements, the speed is continuously changed, until either a threshold value is reached or at least one of said switching elements is deactivated.

4. The power tool of claim 1, wherein said controller is configured to change the speed of said motor by predetermined increments.

5. The power tool of claim 1, wherein said controller further comprises a memory for storing a last-set desired speed value, which is stored at the time of the deactivation of at least one of said switching elements previously activated for speed setting.

6. The power tool of claim 5, wherein said memory is configured to retain said last-set speed value even when the motor is at a standstill or is switched off.

7. The power tool of claim 1, further comprising a housing having a left-hand gripping region and a right-hand gripping region, and a central region; wherein each of said switching elements comprises an actuating member, a first actuating member of said first switching element being arranged within said central region, second and third actuating members of said second and third switching elements being arranged within said left-hand and right-hand gripping regions.

8. The power tool of claim 7, wherein said activating members comprise flexible pushbuttons being configured for soft-touch activation of said switching elements.

9. The power tool of claim 8 being configured as an angle grinder, wherein said housing is formed substantially in a bar-shaped manner and comprises a gearhead at one end thereof, said gearhead supporting said first switching element, said second and third switching elements being supported on said left-hand and right-hand sides of said housing.

10. The power tool according of claim 9, wherein said housing is dimensioned so as to allow grasping of the housing with one hand, said flexible pushbuttons of said second and third switching elements being arranged in a gripping region of a thumb on the one side and of an index finger or middle finger on the other side.

11. The power tool of claim 8 being configured as a tool selected from the group formed by an angle grinder and a drill, wherein said housing is formed substantially in a pistol-shaped manner having a pistol grip, a right-hand and a left-hand side, the pushbutton of said first switching element being arranged in a center of said pistol grip within a gripping region of an index finger, the pushbuttons of said second and third switching elements being arranged on said right-hand and left-hand sides.

12. The power tool of claim 1, further comprising a housing and a fourth switching element being connected to said controller;
wherein two ones of said switching elements are arranged on a left-hand side of said housing and two other ones of said switching elements are arranged on a right-hand side of said housing;
wherein said controller is configured so that the speed is increased upon activation of two of said switching elements arranged on a first side selected from the group formed by the left-hand side and the right-hand side, and so that the speed is decreased upon activation of two other ones of said switching elements arranged on the other side of the housing.

13. The power tool of claim 1, further comprising a housing, a fourth switching element and a fifth switching element both of which being connected to said controller;
wherein said housing comprises a central part, a left-hand part and a right-hand;
wherein said first switching element is arranged on said central part of said housing;
wherein two ones of said second, third, fourth and fifth switching elements are arranged on the left-hand part of the housing and two other ones of said second, third, fourth and fifth switching elements are arranged on the right-hand part of the housing;
wherein said controller is configured so that the speed is increased upon activation of said first switching element and one of said two ones of said switching elements, and so that the speed is decreased upon activation of said first switching element and one of said other ones of said switching elements.

14. The power tool of claim 1, wherein at least one said switching elements is selected from the group formed by:
an optical switching element comprising a light transmitting conductor for transmitting a light beam emitted by a light source into a receiving conductor and a an evaluation means for evaluating the light received by said receiving conductor to generate a switching signal; and
a micro-switch lying in a signal circuit, while said controller is configured to control said motor via a power-circuit.

15. A power tool comprising:
a controller for controlling at least one operating parameter of said power tool;
a motor for driving a tool;
a first, a second and at least a third switching element, said switching elements being coupled to said controller; and
a speed sensor for monitoring the speed of the motor to generate a speed signal which is input to said controller;
wherein said controller is configured for
outputting a first control signal for modifying said operating parameter in a first way, if said speed signal indicates a speed greater than zero and if said first switching element and said second switching element are activated simultaneously; and
for outputting a second control signal for modifying said operating parameter in a way different from said first way, if said speed signal indicates a speed greater than zero and, if at least two of said switching elements are activated simultaneously, at least one of which being different from said first and second switching elements.

16. The power tool of claim 15, wherein said operating parameter to be controlled is the setting of right-hand/left-hand rotation, and wherein said controller is configured for outputting a control signal for setting the motor upon activation of a first switching element and a second switching element to right-hand rotation and for setting the motor to left-hand rotation upon activation of the first and at least one other switching element different from said first and second switching elements.

17. The power tool of claim 12, wherein said controller is configured so as to allow a power-on of said motor only upon simultaneous activation of at least two switching elements.

18. The power tool of claim 17, further comprising a housing having a front-region and a rear-region, wherein said controller is configured so as to allow a power-on of said motor only upon simultaneous activation of a switching element arranged in said front region and of a switching element arranged in said rear region.

19. A method of controlling at least any operating parameter of a power tool comprising a motor for driving a tool, a controller for controlling the operation of the power tool, and at least three switching elements being coupled to the controller for controlling the operating parameter, the method comprising the following steps:
monitoring the speed of said motor;
monitoring the operating states of said switching elements;
controlling said operating parameter in dependence on the speed of the motor and the switching states of the switching elements.

* * * * *